United States Patent [19]

Pirrallo et al.

[11] Patent Number: 5,368,139
[45] Date of Patent: Nov. 29, 1994

[54] DRUM BRAKE SHOE HOLD DOWN NAIL AND SPRING RETAINER

[75] Inventors: Frank G. Pirrallo, Spring Valley; Gregory M. Hickey, Dayton, both of Ohio

[73] Assignee: General Motors Corporation, Detroit, Mich.

[21] Appl. No.: 86,405

[22] Filed: Jul. 2, 1993

[51] Int. Cl.$^5$ ............................................. F16D 51/00
[52] U.S. Cl. ..................................... 188/78; 188/340
[58] Field of Search .................. 188/78, 325, 327, 328, 188/334, 337, 340, 341; 248/612; 411/523, 337

[56] References Cited

U.S. PATENT DOCUMENTS

| 2,111,297 | 3/1938 | Pontius, Jr. | 188/340 |
| 2,352,392 | 6/1944 | Kost | 411/523 |
| 2,796,954 | 6/1957 | Kaiser | 188/78 |
| 2,859,839 | 11/1958 | Throne et al. | 188/78 |
| 2,868,484 | 1/1959 | Burrise | 248/612 |
| 3,186,519 | 6/1965 | Johannesen | 188/78 |
| 3,343,633 | 9/1967 | Kennel et al. | 188/78 |
| 3,459,096 | 8/1969 | Parkin | 411/523 |
| 4,623,050 | 11/1986 | Copp | 188/340 |
| 4,842,465 | 6/1989 | Pease et al. | 411/337 |

FOREIGN PATENT DOCUMENTS

| 1246418 | 6/1969 | United Kingdom . |
| 2000561 | 1/1979 | United Kingdom ................ 188/340 |
| 2039644 | 8/1980 | United Kingdom ................ 188/340 |
| 2205909 | 12/1988 | United Kingdom ................ 188/340 |

*Primary Examiner*—Andres Kashnikow
*Assistant Examiner*—Chris Schwartz
*Attorney, Agent, or Firm*—Kevin M. Hinman

[57] ABSTRACT

A new and improved brake shoe hold down mechanism for retaining a brake shoe to an inside surface of a backing plate includes a nail having a head disposed on an outside surface of the backing plate limiting axial travel of the nail and a barb-like tip adapted to pass through apertures in the backing plate and a web of the brake shoe. A wire spring is disposed on a first end against the brake shoe and has a coil on a second aligned with the tip of the nail. A cup shaped retainer cap is compressively seated against the spring coil and engaged by the tip of the nail at a bottom of the cap thereby biasing the brake shoe against the backing plate. The retainer cap has a slot from a first position at which the nail tip is received and which is offset from the bottom of the cap to a second position at a bottom of the cap to which the tip is biased by the compressive spring load. The tip engages the bottom of the cap independent of orientation to the slot.

2 Claims, 2 Drawing Sheets

DRUM BRAKE SHOE HOLD DOWN NAIL AND SPRING RETAINER

TECHNICAL FIELD

This invention relates to the field of drum brakes. More specifically, it relates to the retention of brake shoes to backing plates.

BACKGROUND OF THE INVENTION

A brake shoe is typically biased against a backing plate by a spring compressed between a web of the backing plate and a retainer cap which has its travel limited relative to the backing plate by a nail with its head disposed outside the backing plate and a flat barb-like tip on the opposite end engaging the retainer cap. The barb-like tip passes through an opening of complementary shape in the cap with the cap being twisted approximately 90 degrees relative to the flange to produce engagement between the nail and the cap. It is desirable to eliminate the need for this twisting motion. The present invention provides a nail and cap combination which can be assembled without any twisting motion.

SUMMARY OF THE INVENTION

This invention is a new and improved brake shoe hold down mechanism for retaining a brake shoe to an inside surface of a backing plate, including a nail having a head disposed on an outside surface of the backing plate limiting axial travel of the nail and a barb-like tip adapted to pass through apertures in the backing plate and a web of the brake shoe. A wire spring is disposed on a first end against the brake shoe and has a coil on a second aligned with the tip of the nail.

A cup shaped retainer cap is compressively seated against the spring coil and engaged by the tip of the nail at a bottom of the cap, thereby biasing the brake shoe against the backing plate. The retainer cap has a slot from a first position at which the tip is received and which is offset from the bottom of the cap to a second position at the bottom of the cap to which the tip is biased by the compressive spring load. The tip engages the bottom of the cap independent of orientation to the slot.

DESCRIPTION OF THE PREFERRED EMBODIMENT

Figure 1:
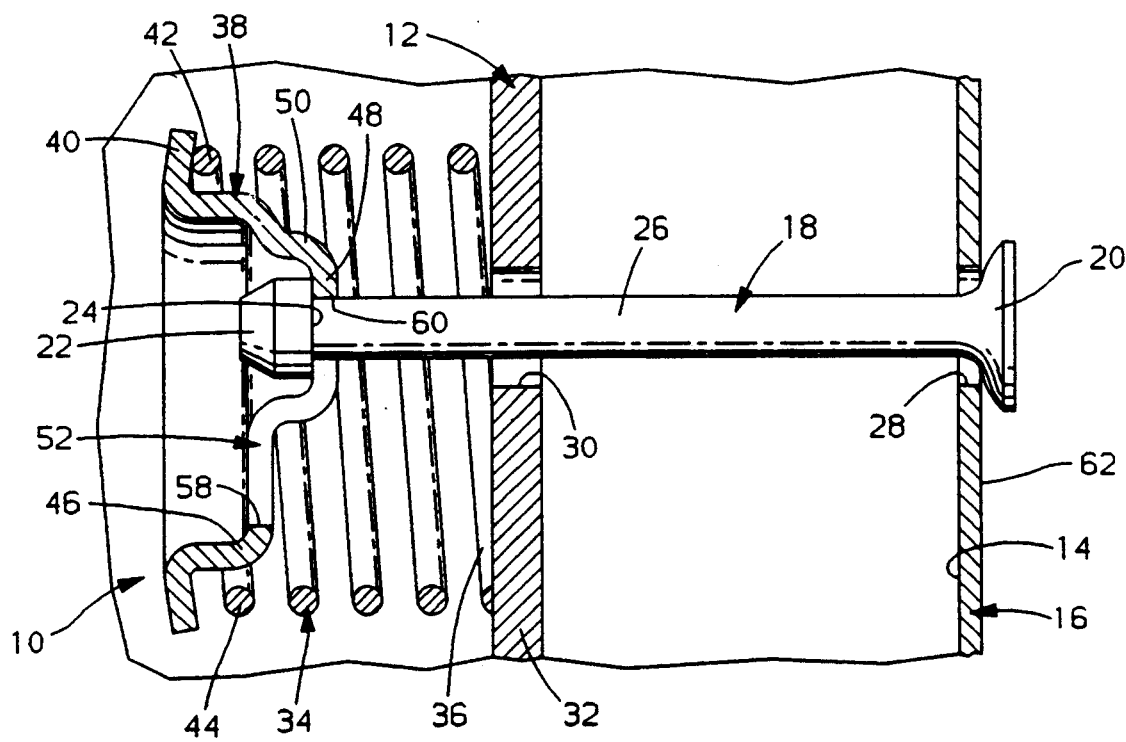
FIG. 1 is a sectional side view of the retainer cap and nail as installed in a brake assembly.
Figure 3:
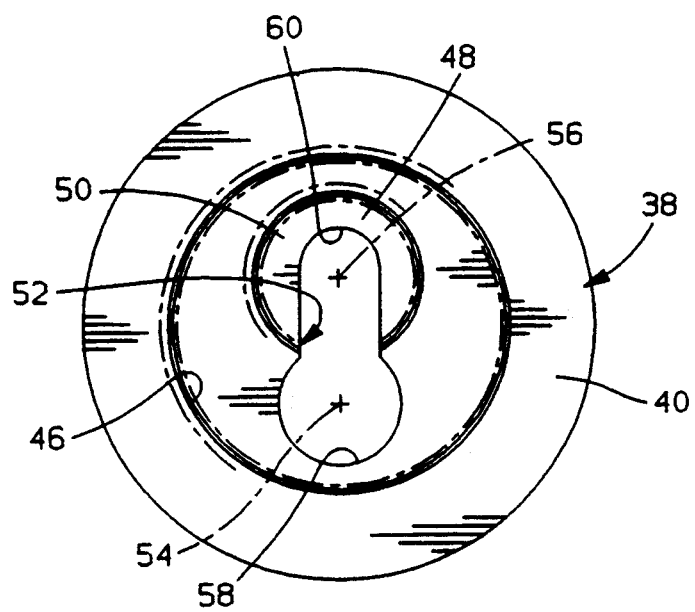
FIG. 3 is a top view of the retainer cap.
Figure 2:
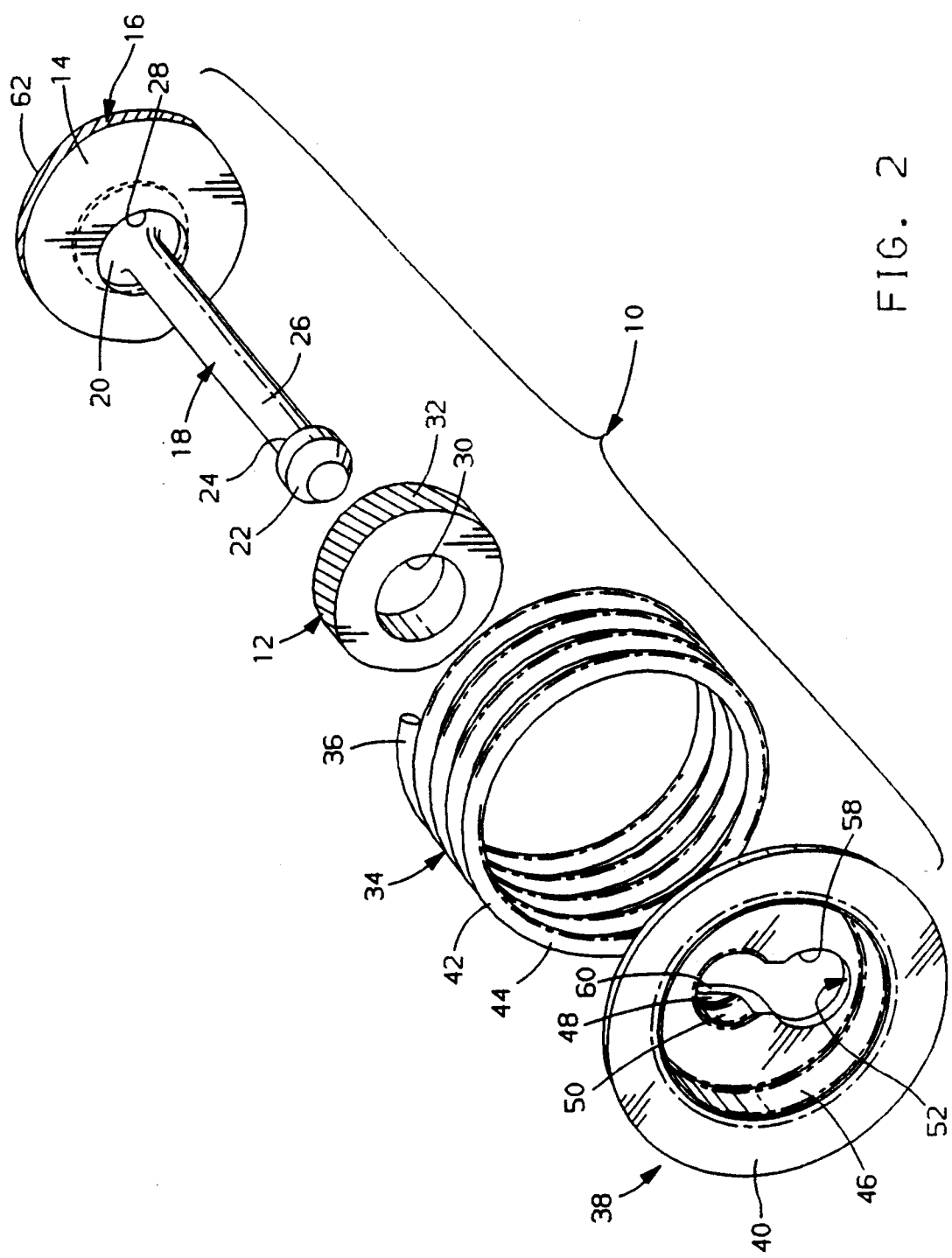
FIG. 2 is an exploded view of the retainer cap and nail in a brake assembly.

A brake shoe hold down mechanism 10 retains a brake shoe 12 to an inside surface 14 of a backing plate 16. The hold down mechanism 10, according to this invention includes a nail 18 having a head 20 and a barb-like tip 22 opposite the head 20. The tip 22 is barb-like in that it has an engaging surface 24 adjacent to a smaller neck 26. Here, the preferred tip shape is conical, but the tip 22 could also be spherical or some alternative shape.

The tip 22 is adapted to pass through an aperture 28 in the backing plate 16 and an aperture 30 in a web 32 of the brake shoe 12. The tip 22 is disposed beyond the web 32, distal to the backing plate 16.

The mechanism 10 also includes a helically coiled wire spring 34 disposed over the nail tip 22 with a first end 36 against the web 32 of the brake shoe 12.

A cup-shaped retainer cap 38 has a circumscribing lip portion 40 adapted to engage a last coil 42 at a second end 44 of the spring 34. A cylindrical body portion 46 connected with the lip portion 40 of the cap 38 is adapted to fit inside the spring 34. A bottom 48 of the cap 38 is defined by a recessed pocket 50 projecting downward from the body portion 46.

A keyhole shaped slot 52 in the body portion 46 extends from a first position 54 offset from the bottom 48 of the cap 38 to a second position 56 at the bottom 48 of the cap 38. The slot 52 has a large end 58 at the first position 54 sized to accommodate the nail tip 22 passing through it. The rest of the slot 52 has a width near that of the neck 26 of the nail 18 which is maintained to a small end 60 of the slot 52 at the second position 56.

The invention is employed in the following manner. An assembler passes the tip 22 of the nail 18 through the aperture 28 in the backing plate 16. The head 20, too large to pass through the aperture 28 in the backing plate 16, is disposed on an outside surface 62 of the backing plate 16 and limits axial travel of the nail 18 into the backing plate 16.

The brake shoe 12 is placed on the backing plate 16 with the nail tip 22 passing through the aperture 30 in the brake shoe web 32. The spring 34 is placed over the nail tip 22 with the first end 36 against the web 32. With the spring 34 so disposed over the nail tip 22, the spring 34 is approximately aligned with the nail tip 22 over its length from the first end 36 to the last coil 42 at the second end 44.

The cap 38 is seated on the last coil 42 with the lip portion 40 contacting the last coil 42 and the body portion 46 disposed inside the spring 34. The assembler presses the cap 38 toward the tip 22 of the nail 18, aligning the large end 58 of the slot 52 with the nail tip 22 and compressing the spring 34 until the tip 22 passes through the large end 58 of the slot 52. The cap 38 is then laterally shifted by the assembler so that the nail 18 moves from the large end 58 toward the small end 60 of the slot 52.

The assembler releases the cap 38 with the compressed spring 34 biasing the cap 38 away from the brake shoe 12 thereby biasing the nail tip 22 to the bottom 48 of the cap 38. The cap 38 is retained by engagement between the nail tip 22 and the bottom 48 of the cap 38. The compressed spring 34, trapped between the cap 38 and the brake shoe 12, biases the brake shoe 12 against the backing plate 16.

The tip 22 of the nail 18 always engages the bottom 48 of the cap 38 independent of rotational orientation therebetween. This is due to the engaging surface 24 having a constant radius and the slot 52 having a relatively narrow width at the small end 60, which ensures that the tip 22 always contacts the bottom 48 on both sides of the slot 52.

Unlike conventional retainer caps which require a 90 degree twist or rotation by the assembler to engage the cap with the tip of the nail, no twisting motion is needed to produce that engagement between the nail 18 and the cap 38 of the present invention. Only a minor lateral shift of the cap 38 to move the nail tip 22 to the small end 60 of the slot 52 is needed for engagement.

The embodiments of the invention in which an exclusive property or privilege is claimed are defined as follows:

1. In a brake shoe hold down mechanism for retaining a brake shoe to an inside surface of a backing plate including
   a nail having
      a head disposed on an outside surface of a backing plate limiting axial travel of the nail and
      a radially expanded tip forming a shoulder adapted to pass through both an aperture in the backing plate and an aperture in a web of a brake shoe and disposed beyond the web,
   a wire spring disposed on a first end against the brake shoe and having a coil on a second end aligned with the tip of the nail, and
   a cup shaped retainer cap compressively seated against the spring coil and engaged by the shoulder of the tip at a bottom of the cap thereby biasing the brake shoe against the backing plate, the improvement comprising:
   an open end and a substantially closed end in the cap, the substantially closed end having a slot with a wide end and a narrow end, the substantially closed end having a first planar level and a second planar level axially offset from each other, the first planar level located between the second planar level and the open end, the second planar level comprising part of a recess in the substantially closed end of the cap, wherein the wide end of the slot is located on the first planar level of the substantially closed end and the narrow end of the slot is located on the second planar level, wherein the nail tip is biased by the compressive spring to seat in the narrow end of the slot on the second planar level of the substantially closed end of the cap, and
   the tip engaging the second planar level of the cap independent of rotational orientation to the slot.

2. The apparatus of claim 1 wherein the cap has a circular perimeter, wherein first and second centers of the first and second ends of the slot are offset from a center of the substantially closed end of the cap and wherein the recess is offset from the center of the substantially closed end of the cap.

* * * * *